United States Patent
Jentz et al.

(10) Patent No.: US 8,739,766 B2
(45) Date of Patent: Jun. 3, 2014

(54) METHOD AND SYSTEM FOR FUEL VAPOR CONTROL

(75) Inventors: Robert Roy Jentz, Westland, MI (US); Mark W. Peters, Wolverine Lake, MI (US); Ann Irene DeZelia, Milan, MI (US); Aed Mohammad Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 508 days.

(21) Appl. No.: 13/198,299

(22) Filed: Aug. 4, 2011

(65) Prior Publication Data
US 2013/0032127 A1    Feb. 7, 2013

(51) Int. Cl.
*F02M 1/00*    (2006.01)

(52) U.S. Cl.
USPC ............................ 123/516; 123/518; 123/520

(58) Field of Classification Search
CPC ...................... F02M 25/0836; B60K 15/03504
USPC .................................................. 123/516–520
See application file for complete search history.

(56) References Cited

U.S. PATENT DOCUMENTS

| | | | |
|---|---|---|---|
| 6,913,002 B2 | 7/2005 | Mashimo et al. | |
| 7,472,582 B2 | 1/2009 | Ito et al. | |
| 7,506,639 B2 | 3/2009 | Saito | |
| 7,562,559 B2 | 7/2009 | Chung et al. | |
| 7,720,592 B2 * | 5/2010 | Leone et al. | 701/103 |
| 7,869,930 B2 * | 1/2011 | Stein et al. | 701/104 |
| 7,957,888 B2 * | 6/2011 | Leone et al. | 701/103 |
| 8,078,386 B2 * | 12/2011 | Stein et al. | 701/104 |
| 8,434,461 B2 * | 5/2013 | Kerns et al. | 123/521 |
| 8,551,214 B2 * | 10/2013 | Dudar et al. | 95/19 |
| 2009/0266147 A1 | 10/2009 | Maegawa | |

* cited by examiner

*Primary Examiner* — John Kwon
(74) *Attorney, Agent, or Firm* — Julia Voutyras; Alleman Hall McCoy Russell & Tuttle LLP

(57) ABSTRACT

Methods and systems are provided for operating an engine to generate vacuum for a subsequent leak detection routine. During a selected key-off condition, a starter motor is operated to spin the engine unfueled and generate intake vacuum for the leak detection. Fuel vapors drawn during the spinning are stored in an auxiliary canister that is purged along with a main canister during purging conditions.

20 Claims, 3 Drawing Sheets

METHOD AND SYSTEM FOR FUEL VAPOR CONTROL

FIELD

The present application relates to fuel vapor purging in vehicles, such as hybrid vehicles.

BACKGROUND AND SUMMARY

Vehicle emission control systems may be configured to store fuel vapors from fuel tank refueling operations and diurnal engine operation, and then purge the stored vapors during a subsequent engine operation. In an effort to meet stringent federal emissions regulations, emission control systems may need to be intermittently diagnosed for the presence of leaks that could release fuel vapors to the atmosphere. Evaporative leaks may be identified by sealing off the emission control system after generating a vacuum therein, and then monitoring the vacuum bleed-up. In hybrid vehicles, leak detection routines may be adapted to account for the reduced engine operation times which can lead to insufficient vacuum for leak detection and purging routines.

One example approach for detecting evaporative leaks in a hybrid vehicle is shown by Chung et al. in U.S. Pat. No. 7,562,559. Therein, when the vehicle engine is not running, or during an electric drive mode, fuel injection and throttle operation to the engine is disabled while an electric motor or generator is operated to spin the engine and generate vacuum for a leak detection operation. After generating sufficient vacuum, the emission control system is sealed and evaporative leaks are diagnosed.

However, the inventors herein have identified potential issues with such an approach. As one example, when the engine is being spun to generate vacuum, fuel vapors may be drawn from the fuel tank into the engine intake manifold. The drawn fuel vapors may lead to air-to-fuel ratio variations during subsequent engine operation. The situation may be exacerbated if the engine is spun during hot ambient conditions that lead to the generation of more diurnal fuel vapors. As another example, if the engine is spun to generate vacuum while the vehicle is stationary during fuel tank refueling, or while the vehicle operator is inspecting the vehicle, the operator may be startled.

Thus, in one example, some of the above issues may be at least partly addressed by a method of operating an emission control system comprising, during a first key-on condition, spinning the engine fueled and storing fuel tank vapors in a first, larger canister, and during a second key-off condition, spinning the engine unfueled and storing fuel tank vapors in a second, smaller canister. In this way, fuel vapors drawn from the fuel tank during vacuum generation may be stored in an auxiliary in-line canister that is distinct from the main fuel vapor canister.

For example, during specified conditions, such as when the engine has not been running for a threshold amount of time, the engine may be spun with assistance from a starter motor, without any air or fuel injection into the engine cylinders, to generate vacuum for a subsequent leak detection routine. Following vacuum generation, the vacuum may be applied to the engine's fuel system to identify fuel system leaks (e.g., from the fuel tank and/or from the main, larger fuel vapor canister). Vacuum generation may be disabled if the fuel tank is being refueled, if the ambient temperature is higher than a threshold, and/or if the vehicle operator is in the vehicle. Fuel vapors drawn from the fuel tank during vacuum generation may be stored in the auxiliary smaller canister coupled in-line between the fuel tank and the intake manifold. Purging of fuel vapors stored in the auxiliary canister may be coordinated with the purging of fuel vapors from the main canister during subsequent engine operation.

In this way, an engine may be spun without fuel injection to generate a vacuum for evaporative leak diagnostics, while fuel tank vapors are isolated from the spinning engine by an auxiliary canister. By reducing the amount of fuel vapors drawn into the intake manifold during vacuum generation, air-to-fuel ratio deviations during a subsequent engine operation may be reduced. Also, by disabling the vacuum generation under specified engine-off conditions, the vehicle operator may not be alarmed.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
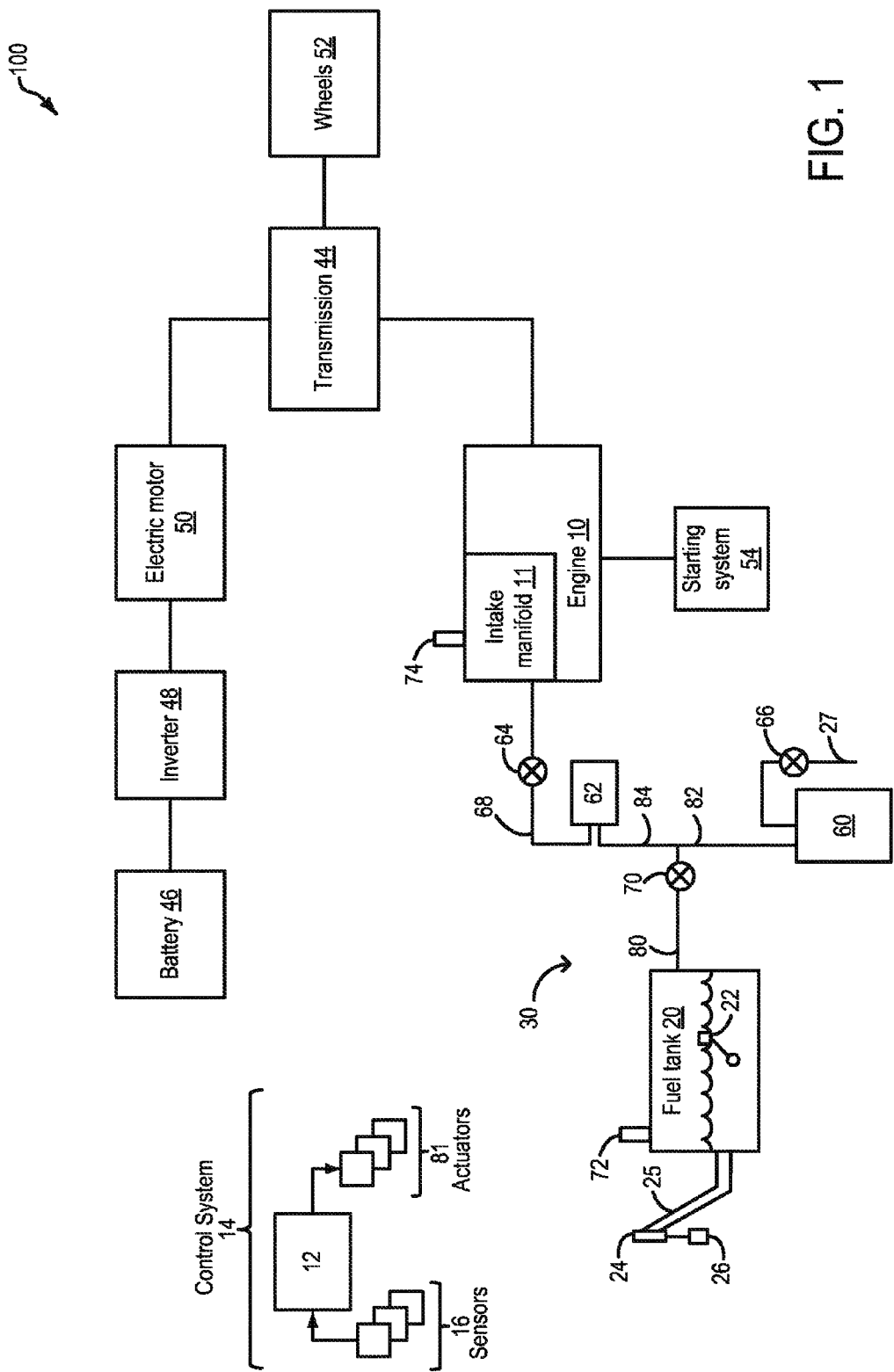
FIG. 1 shows a schematic depiction of an engine and an associated fuel vapor recovery system.

The following description relates to systems and methods for controlling an engine system coupled to fuel system, such as the system of FIG. 1. An unfueled engine is spun during selected vehicle key-off conditions to generate vacuum for a subsequent leak detection routine. An engine controller may be configured to perform a control routine, such as the routine of FIG. 2, to operate an engine starter motor to spin the engine, unfueled, and generate an amount of vacuum. Fuel vapors drawn from the fuel tank during the spinning are retained in a smaller in-line canister. Once a threshold amount of vacuum has been generated, the engine spinning is stopped, and the fuel system is sealed to perform a leak detection routine. Any fuel vapors retained in the smaller canister are purged in coordination with the purging of a main, larger canister of the fuel system during purging conditions, as elaborated in FIG. 3. By performing the leak detection during static conditions wherein noise factors are mitigated, the signal to noise ratio of the detection is improved while reducing the required calibration effort. By storing fuel vapors in the smaller canister during vacuum generation, the fuel vapors are not drawn into the intake manifold, and air-to-fuel ratio deviations during a subsequent engine operation can be reduced.

FIG. 1 depicts a hybrid propulsion system 100 for a vehicle. Hybrid propulsion system 100 includes an internal combustion engine 10 including an intake manifold 11. Engine 10 is coupled to transmission 44. Transmission 44 may be a manual transmission, automatic transmission, or combinations thereof. Further, various additional components may be included, such as a torque converter, a gear set, a final drive unit, etc. Transmission 44 is shown coupled to drive wheels 52, which may contact a road surface.

Transmission 44 may alternatively be driven by an electric motor 50. Electric motor 50 is powered by energy stored in an energy storage device, herein battery 46. Other energy storage devices may include a capacitor, a flywheel, a pressure vessel, etc. An energy conversion device, herein inverter 48, may be configured to convert the DC output of battery 46 into an AC output for use by electric motor 50. Electric motor 50 may also be operated in a regenerative mode, that is, as a generator, to absorb energy from vehicle motion and/or the engine and convert the absorbed energy to an energy form suitable for storage in battery 46. Furthermore, electric motor 50 may be operated as a motor or generator, as required, to augment or absorb torque during a transition of engine 10 between different combustion modes (e.g., during transitions between a spark ignition mode and a compression ignition mode).

Engine 10 may be started with an engine starting system 54, including a starter motor. In one example, a battery-operated starter motor may be coupled to the engine, the starter motor driven by energy from battery 46. In another example, the starter may be a powertrain drive motor, such as a hybrid powerplant connected to the engine by way of a coupling device. The coupling device may include a transmission, one or more gears, and/or any other suitable coupling device. The starter may be configured to support engine restart at or below a predetermined near zero threshold speed (e.g., below 50 or 100 rpm). In other words, by operating the starter motor of starting system 54, the engine 10 may be spun. During some conditions, such as during a key-on condition when engine operation is desired for vehicle motion, the engine may be started (e.g., using starter motor assistance) and spun fueled (that is, with fuel and air being injected into engine cylinders) to enable cylinder combustion. During other conditions, as elaborated in FIG. 2, such as during selected key-off conditions, the engine may be started with starter motor assistance and spun unfueled (that is, with no air or fuel injected into the engine cylinders) to generate intake vacuum. The engine may be spun until a threshold vacuum is generated after which the spinning may be stopped. The generated vacuum may be subsequently applied to engine fuel system 30 for leak detection diagnostics.

Hybrid propulsion system 100 may be operated in various embodiments including a full hybrid system, wherein which the vehicle is driven by only the engine, only the electric motor, or a combination of both. Alternatively, assist or mild hybrid embodiments may also be employed, wherein the engine is the primary source of torque, and the electric motor selectively adding torque during specific conditions, such as during a tip-in event. Accordingly, hybrid propulsion system 100 may be operated in various modes of operation. For example, during an "engine-on" mode, engine 10 may be operated and used as the primary source of torque for powering wheels 52. During the "engine-on" mode, fuel may be supplied to engine 10 from fuel system 30 including fuel tank 20. In another example, during an "engine-off" mode, electric motor 50 may be operated to power the wheels. The "engine-off" mode may be employed during braking, low speeds, while stopped at traffic lights, etc. In still another example, during an "assist" mode, an alternate torque source may supplement and act in cooperation with the torque provided by engine 10.

Fuel system 30 includes fuel tank 20 coupled to engine intake manifold 11. Fuel tank 20 may hold a plurality of fuels, such as gasoline, or fuel blends, such as fuel with a range of alcohol (e.g., ethanol) concentrations including E10, E85, etc., and combinations thereof. Fuel tank may include a fuel level sensor 22 for sending a signal regarding a fuel level win the tank to controller 12. Fuel level sensor 22 may comprise a float connected to a variable resistor, as shown. Alternatively, other types of fuel level sensors may be used. In response to a fuel level falling below a threshold, a fuel tank refuel request may be made and the vehicle operator may stop the vehicle for refueling. Fuel may be pumped into the vehicle from an external source during the refueling event via a refueling line 25 that forms a passageway from a refueling door 24 located on an outer body of the vehicle. A refueling door sensor 26 coupled to refueling door 24 may be a position sensor that sends input signals corresponding to an open or closed state of the refueling door to controller 12.

Fuel system 30 may include one or more fuel vapor recovery devices, such as one or more canisters, filled with an appropriate adsorbent, for temporarily trapping fuel vapors (including vaporized hydrocarbons) generated in the fuel tank. In one example, the adsorbent used is activated charcoal. The one or more canisters may be in communication with an upper internal volume of fuel tank 20 via a vapor line 80. As such, fuel vapors may be generated in the fuel tank during fuel tank refueling events (refueling fuel vapors) as well as during vehicle operation (diurnal fuel vapors). When purging conditions are met (FIG. 3), such as when the canisters are saturated, the stored fuel vapors may be purged to engine intake manifold 11 by opening a canister purge valve (CPV) 64. By storing the fuel vapors in the canister, and purging them at a later time during engine operation, vehicle emissions may be reduced while improving fuel economy.

In the depicted example, fuel system 30 includes a first, larger canister 60 coupled to the engine intake manifold 11 upstream of fuel tank 20, and a second smaller canister 62 coupled to the intake manifold downstream of fuel tank 20. Vapor line 80 may be branched into a first branch line 82 and a second branch line 84, wherein first canister 60 is coupled to fuel tank 20 via first branch line 82 and second canister 62 is coupled to fuel tank 20 via second branch line 84. As elaborated herein, first, larger canister 60 may be configured as a primary, or main, canister of fuel system 30 configured to retain and store refueling and diurnal fuel vapors generated in the fuel tank during vehicle operation (e.g., during a key-on condition). In comparison, second, smaller in-line canister 62 may be configured as an auxiliary canister for retaining and storing fuel vapors drawn into the intake manifold during selected key-off conditions when the engine is spun, unfueled, to generate vacuum for a leak detection routine. In other words, the amount of fuel vapors drawn into canister 62 during the selected key-off conditions may be smaller than the amount of fuel vapors drawn into canister 60 during the selected key-on conditions. While the depicted example shows the primary canister (first canister 60) as a single canister, it will be appreciated that in alternate embodiments, a plurality of such canisters may be connected together.

First canister 60 may include a vent 27 for routing gases flown there-through to the atmosphere when storing, or trapping, fuel vapors from fuel system 30. Vent 27 may also allow fresh air to be drawn into fuel system 30 when purging stored fuel vapors from fuel system 30 to engine intake manifold 11 via purge line 68 and canister purge valve 64. Vent 27 may include an optional canister vent valve (CVV) 66 to adjust a flow of air and vapors between canister 60 and the atmosphere. The canister vent valve 66 may also be used for diagnostic routines. When included, the vent valve may be opened during fuel vapor storing operations (for example, during fuel tank refueling and while the engine is not running) so that air, stripped of fuel vapors after having passed through the canister, can be pushed out to the atmosphere. Likewise, during purging operations (for example, during canister regeneration and while the engine is running), canister vent valve 66 may be opened to allow a flow of fresh air to strip the fuel vapors stored in the canister, and canister purge valve 64 may be opened to flow the purged vapors into the intake manifold 11. While this example shows vent 27 communicating with fresh, unheated air, various modifications may also be used. For example, fresh air heated through a heat exchanger may be used to purge the canister. As such, by commanding the canister vent valve to be closed, the controller may seal the fuel system from the atmosphere. Likewise, by commanding the canister purge valve to be closed, the controller may seal the fuel system from the engine intake manifold.

An optional canister check valve (not shown) may be included in purge line 68 to prevent intake manifold pressure from flowing gases in the opposite direction of the purge flow. In one example, where engine 10 is a boosted engine including a boosting device such as a turbocharger, the check valve may be included to prevent the boosted intake manifold pressure from flowing gases into the purge line in the reverse direction. The check valve may be positioned between the canister purge valve and the intake manifold, or may be positioned before the purge valve. As such, the check valve may be necessary if the canister purge valve control is not accurately timed or the canister purge valve itself can be forced open by a high intake manifold pressure. An estimate of the manifold absolute pressure (MAP) may be obtained from a MAP sensor (not shown) coupled to intake manifold 11, and communicated with controller 12. Alternatively, MAP may be inferred from alternate engine operating conditions, such as mass air flow (MAF), as measured by a MAF sensor (not shown) coupled to the intake manifold.

The hybrid propulsion system 100 may have reduced engine operation times due to the vehicle being powered by engine 10 during some conditions, and by the electric motor 50 under other conditions. While the reduced engine operation times reduce overall carbon emissions from a vehicle, they may also lead to insufficient purging of fuel vapors stored in the one or more canisters of the vehicle's fuel system. To address this, fuel tank 20 may be designed to withstand high fuel tank pressures. For example, fuel tank 20 may be constructed of material that is able to structurally withstand high fuel tank pressures, such as fuel tank pressures that are higher than a threshold and below atmospheric pressure.

Additionally, a fuel tank isolation valve (FTIV) 70 may be positioned in vapor line 80, upstream of (or at) a branch point from where branch lines 52 and 54 originate. Alternatively, FTIV 70 may be included in branch line 82. FTIV 70 may normally be kept closed to limit the amount of fuel vapors directed to canister 60 from fuel tank 20. Specifically, the normally closed FTIV separates storage of refueling vapors from the storage of diurnal vapors. FTIV may be opened only during refueling and purging operations to allow refueling vapors to be directed to canister 60. In one example, the normally closed FTIV is opened only during refueling and purging (e.g., if the fuel tank pressure is higher than a threshold) to allow refueling vapors to be directed to canister 60.

One or more pressure sensors 72 may be coupled to fuel tank 20 to provide an estimate of a fuel tank pressure. Alternatively, the pressure sensors may be positioned upstream and/or downstream of FTIV 70 to provide an estimate of the fuel tank pressure. One or more oxygen sensors 74 may be provided downstream of the canisters, in the engine intake (as depicted), and/or in the exhaust, to provide an estimate of the hydrocarbon (HC) load or capacity of the canisters.

As such, one or more of FTIV 70, canister purge valve 64, and canister vent valve 66 may be solenoid valves wherein operation of the valves may be regulated by adjusting a driving signal to the dedicated solenoid (not shown). In one example, during a purging operation, the quantity and rate of vapors released to the intake manifold 11 along purge line 68 by the canister purge valve 64 may be determined by the duty cycle of an associated canister purge valve solenoid. As such, the duty cycle of the canister purge valve solenoid may be determined by the vehicle's powertrain control module (PCM), such as controller 12, responsive to engine operating conditions, including, for example, an air-to-fuel ratio.

Hybrid propulsion system 100 may further include control system 14. Control system 14 is shown receiving information from a plurality of sensors 16 (various examples of which are described herein) and sending control signals to a plurality of actuators 81 (various examples of which are described herein). As one example, sensors 16 may include pressure sensor 72, fuel door position sensor 26, fuel level sensor 22, oxygen sensor 74 coupled to the intake manifold, various exhaust gas sensors located upstream of an engine emission control device, etc. Other sensors such as additional pressure, temperature, air/fuel ratio, and composition sensors may be coupled to various locations in the propulsion system 100. As another example, the actuators may include purge valve 64, vent valve 66, FTIV 70, cylinder fuel injectors (not shown), an air intake throttle coupled to the engine intake manifold (not shown), etc. The control system 14 may include a controller 12. The controller may receive input data from the various sensors, process the input data, and trigger the actuators in response to the processed input data based on instruction or code programmed therein corresponding to one or more routines. Example control routines are described herein with regard to FIGS. 2-3.

Fuel system 30 may be operated by controller 12 in a plurality of modes by selective adjustment of the various valves (and their associated solenoids). For example, the fuel system may be operated in a primary fuel vapor storage mode (e.g., during a fuel tank filling operation and with the engine not running), wherein the controller 12 may open FTIV 70 and canister vent valve 66 while closing canister purge valve (CPV) 64 to direct refueling vapors into first canister 60 while preventing fuel vapors from being directed into the intake manifold.

In another example, fuel system 30 may be operated in a vacuum generation mode (e.g., during a selected key-off condition with the engine running unfueled with starter motor assistance to generate an intake vacuum for a leak detection routine), wherein controller 12 may open CPV 64 and open FTIV 70 while closing CVV 66 to store any fuel vapors drawn from the fuel tank during the engine spinning into second canister 62. Specifically, any fuel tank vapors drawn towards the engine due to the vacuum generated in the intake manifold of the spinning engine may be stored in the smaller in-line canister 62, thereby reducing air-to-fuel ratio disturbances that arise during a subsequent fueled engine operation.

As another example, the fuel system may be operated in a canister purging mode (e.g., after an emission control device light-off temperature has been attained and with the engine running), wherein the controller 12 may open canister purge valve 64 and canister vent valve 66 while closing FTIV 70. Herein, the vacuum generated by the intake manifold of the operating engine may be used to draw fresh air through vent 27 and through canisters 60 and 62 to purge the stored fuel vapors into intake manifold 11. In this mode, the purged fuel vapors from the canister are combusted in the engine. The purging may be continued until the stored fuel vapor amount in the canisters is below a threshold. In an alternate embodiment, rather than using fresh air that is at atmospheric pressure, compressed air that has been passed through a boosting device (such as a turbocharger or a supercharger) may be used for a boosted purging operation. As such, fuel system 30 may require additional conduits and valves for enabling a boosted purging operation. During purging, the learned vapor amount/concentration can be used to determine the amount of fuel vapors stored in each canister, and then, during a later portion of the purging operation (when the canister is sufficiently purged or empty), the learned vapor amount/concentration can be used to estimate a loading state of each canister. In one example, only after a threshold amount of fuel vapors have been purged from the first canister, an amount of diurnal fuel vapors may be purged from the fuel tank to the buffer by opening the FTIV. In another example, only after a threshold amount of fuel vapors have been purged from the second canister, a vacuum generation operation of the engine (wherein the engine is spun unfueled by the starter motor) is enabled.

As still another example, the fuel system may be operated in a fuel tank purging mode (e.g., after the first canister 60 has been purged long enough to reduce a loading state of the canister below a threshold amount of stored fuel vapors), wherein the controller 12 may open FTIV 70 for a duration to purge an amount of fuel vapors from the fuel tank to the canister.

As yet another example, the fuel system may be operated in a refueling mode (e.g., when fuel tank refueling is requested by a vehicle operator), wherein the controller 12 may open FTIV 70 and canister vent valve 66, while maintaining canister purge valve 64 closed, to depressurize the fuel tank before allowing enabling fuel to be added therein. As such, FTIV 70 may be kept open during the refueling operation to allow refueling vapors to be stored in the first canister. After refueling is completed, the FTIV may be closed.

As still another example, the fuel system may be operated in a leak detection mode (e.g., when the engine is in a selected key-off condition and a threshold amount of intake vacuum is present), wherein the controller 12 may close the canister vent valve 66, while opening the purge valve and the FTIV to seal the fuel system. The controller may then apply the vacuum generated in the engine intake manifold to the vehicle fuel system, specifically, the fuel tank and/or the canisters, to detect a leak in the fuel system. Based on a vacuum bleed-up (e.g., bleed-up rate), the controller 12 may identify the presence and diameter of leaks in the fuel tank and/or the canisters. In particular, by performing the leak detection during conditions when the engine is off and the vehicle is stationary, noise factors from fuel sloshing, high temperatures, fuel vaporizations and vehicle dynamics can be reduced, thereby significantly improving the signal to noise ratio. Consequently, leaks even in the order of 0.02" leak size (that is, orifice diameter) can be reliably detected.

Figure 2:
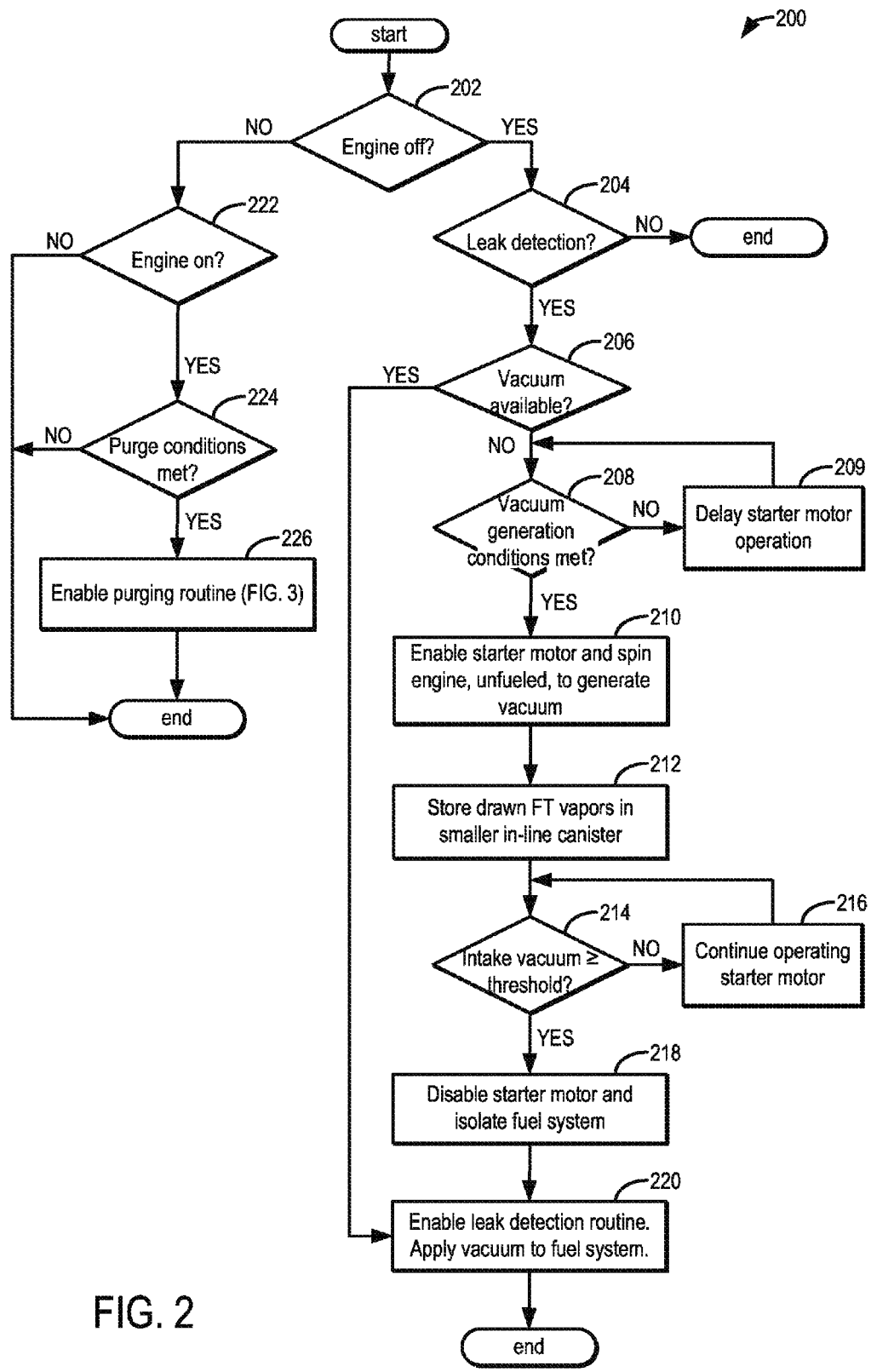
FIG. 2 shows a high level flow chart illustrating a routine for operating the fuel vapor recovery system of FIG. 1.

Now turning to FIG. 2, an example routine 200 is described for operating a vehicle engine and an associated fuel system. The routine enables an engine to be spun, unfueled, during selected key-off conditions, with the help of a starter motor, to generate sufficient intake vacuum for a leak detection routine.

At 202, the routine includes confirming that the engine is off and not running. Specifically, it may be confirmed that the engine is in a key-off condition. If the engine is in the key-off condition, then at 204, it may be determined whether leak detection diagnostics are to be performed. As such, leak detection routines may need to be performed periodically. Thus, in one example, leak detection diagnostics may be performed after a threshold duration since the last leak detection has elapsed. In another example, leak detection diagnostics may be performed after the vehicle has been driven for a threshold distance (e.g., threshold number of miles). If no leak detection is to be performed, the routine may end. If leak detection is required, then at 206, it may be determined whether sufficient vacuum is available for performing the leak detection routine. In one example, it may be determined whether there is sufficient intake vacuum available. Alternatively, if vacuum was stored in a pressure storage device, such as an accumulator, it may be determined if sufficient vacuum is present in the accumulator for performing the diagnostics.

If sufficient vacuum is available, then at 220, a leak detection routine may be enabled. Therein, the available vacuum may be applied to the fuel system (e.g., the fuel tank and/or the canisters) and a vacuum bleed-up may be monitored for the presence of leaks. In one example, if the vacuum bleed-up rate is higher than a threshold, the presence of a leak may be confirmed, provided that the fuel is not highly vaporous. In another example, the presence of a leak may be confirmed based on the final bleed-up pressure in relation to a reference bleed-up pressure. Further, a size of the leak orifice may also be determined based on the final bleed-up pressure relative to a reference pressure determined during a calibration step In one example, the leak detection routine may include a first calibration step. During the calibration step, the vacuum may be applied to a reference orifice having a reference size (or diameter). For example, the fuel system may include a valve containing a reference orifice that is used to determine a vacuum reading in the presence of a small leak of a reference size, such as the EPA standard 0.5 mm. Alternatively, the reference orifice may be included in the purge line of the fuel system, for example, between the canisters and the purge valve, or in a branched purge line arranged in parallel to the purge valve. Based on the configuration, the vacuum is applied to the reference orifice and a vacuum bleed-up is monitored. A final reference vacuum value is determined. The intake vacuum is then applied to the sealed fuel system and a vacuum bleed-up is monitored. The final bleed-up vacuum value obtained while the system is closed is compared to that obtained with the reference orifice. In one example, if the final bleed-up vacuum value of the closed system is less than the reference value (that is, further lower than atmospheric pressure), it may be determined that no leak is detected in the fuel system. In comparison, if the final bleed-up vacuum value is greater than the reference value, (that is, closer to atmospheric pressure), then it may be determined that a leak is present in the fuel system.

It will be appreciated that the leak detection routine may identify leaks responsive to the vacuum bleed-up rate (or final bleed-up vacuum value) being higher than a threshold provided that the fuel is not highly vaporous. As such, vaporous fuels, such as winter-grade fuels, may yield higher bleed-up rates due to their higher volatility (as compared to summer-grade fuels). That is, in a leak-free fuel system wherein the fuel tank is filled with a winter-grade fuel, a leak detection routine that is performed when the ambient temperature is higher than a threshold (e.g., a hot summer day) may yield a false leak indication. In one example, to reduce the occurrence of false positive results (that is, a leak detected when there is no leak), the leak detection routine may be further modified. Specifically, if a potential leak is identified in response to a high vacuum bleed-up rate, the routine may vent the fuel tank to the atmosphere and reseal the fuel system. If after resealing the fuel system, a change in fuel system pressure over time is higher than a threshold (e.g., the pressure changes by more than a predefined amount over a predefined amount of time), then the routine may infer and indicate that the previous high vacuum bleed-up rate was due to the vaporous fuel and that the identified potential leak is a false positive result. Accordingly, the test result may be disregarded, and thus an indication of degradation may be modified based thereon.

By performing the leak detection during a vehicle key-on condition when the vehicle is stationary (e.g., parked), the leak detection can be performed during a static condition wherein the fuel tank temperature is ambient and the signal to noise ratio for the detection routine is improved.

Returning to 206, if sufficient vacuum is not available, then at 208, it may be determined whether vacuum generation conditions are present. Herein, selected key-on conditions may be confirmed. Specifically, vacuum generation conditions may be confirmed in response to each of, the engine being in a key-off condition for a threshold duration, the vehicle being stationary, a fuel tank refueling not taking place (that is, no fuel tank refueling being requested), an ambient temperature being lower than a threshold (that is, cooler temperature conditions), a vehicle operator not being in the vehicle (e.g., the car being parked without the vehicle operator in it), a battery state of charge being higher than a threshold, and a hydrocarbon load of the second, smaller canister of the fuel system (canister 62) being lower than a threshold (e.g., canister 62 being empty).

If all the vacuum generation conditions are met, then at 210, the routine includes operating the starter motor and spinning the engine unfueled, with starter motor assistance, to generate a vacuum in the engine intake manifold. Herein, spinning the engine unfueled includes spinning the engine with no air or fuel injection until a threshold intake vacuum is reached. Specifically, the controller may be configured to disable spark and hold an intake air throttle shut to spin the engine without injecting fuel. For example, the intake air throttle may be moved away from its neutral, partially open position to, or towards, a fully closed position, to expedite vacuum generation while conserving electrical energy. The routine further includes, at 212, storing fuel tank vapors drawn from the fuel during the engine spinning in the smaller canister of the fuel system, that is, the small in-line canister 62 coupled between the fuel tank and the engine intake manifold. As such, if vacuum generation conditions are not confirmed at 208, then at 209, the routine may delay the starter motor operation and the engine spinning until each of the vacuum generation conditions are met.

At 214, it may be confirmed whether the intake vacuum has reached a threshold value. If the threshold intake vacuum is reached, then at 218, the routine includes disabling the starter motor and isolating the fuel system. As previously elaborated, isolating the fuel system includes closing the canister purge valve and the canister vent valve while opening the FTIV to isolate the fuel system from the atmosphere. If the threshold intake vacuum has not been reached, then at 216, the routine includes continuing operating the starter motor and spinning the engine with starter motor assistance until the threshold intake vacuum is reached, and then after the threshold intake vacuum is reached, disabling the starter motor.

It will be appreciated that the controller may include further instructions for disabling the starter motor and stopping the vacuum generation during the engine unfueled spinning in response to one or more of an ambient temperature being higher than a threshold, a fuel tank refuel request being received, a vehicle operator sitting in the vehicle, a vehicle operator opening a vehicle door, hood, window, or trunk of the vehicle, and a HC load of the smaller in-line canister being higher than a threshold. In this way, by stopping the vacuum generation if any of the vacuum generation parameters change, a vehicle operator may not be startled by the sudden noise of an idling engine.

At 220, the routine includes applying the generated intake vacuum to the fuel system, for example, to the fuel tank and/or the main, larger canister, to detect and identify a leak in the fuel system of the vehicle. The controller may then enable a leak detection routine to identify the presence of a leak in the fuel tank and/or the main, larger fuel canister (that is, canister 60 of FIG. 1), as well as a size (e.g., diameter) of the leak orifice. During the leak detection routine, a vacuum may be applied on a sealed fuel system (e.g. fuel tank and/or canister) and a leak may be identified based on a vacuum bleed-up rate, as compared to a reference value.

Returning to 202, if engine off conditions are not confirmed, then at 222, engine on conditions may be confirmed. For example, it may be confirmed that the engine is in a key-on condition. If engine on conditions are confirmed, then at 224, it may be determined whether purging conditions have been met. As such, purging may be confirmed based on various engine and vehicle operating parameters, including the amount of hydrocarbons stored in each of the canister (such as the amount of hydrocarbons stored in the first, larger canister being greater than a first, higher threshold and the amount of hydrocarbons stored in the second, smaller canister being greater than a second, lower threshold), the temperature of an exhaust emission control device (such as the temperature being greater than a threshold), fuel temperature, the number of starts since the last purge (such as the number of starts being greater than a threshold), fuel properties (such as the alcohol amount in the combusted fuel, the frequency of purging increased as an alcohol amount in the fuel increases), and various others. In another example, purge conditions may be confirmed if the controller determines that fuel vapors were directed to the first, larger canister during a preceding engine cycle. If purging conditions are not confirmed, the routine may end. If purging conditions are confirmed, at 226, a purging routine, as elaborated in FIG. 3, may be enabled.

Figure 3:
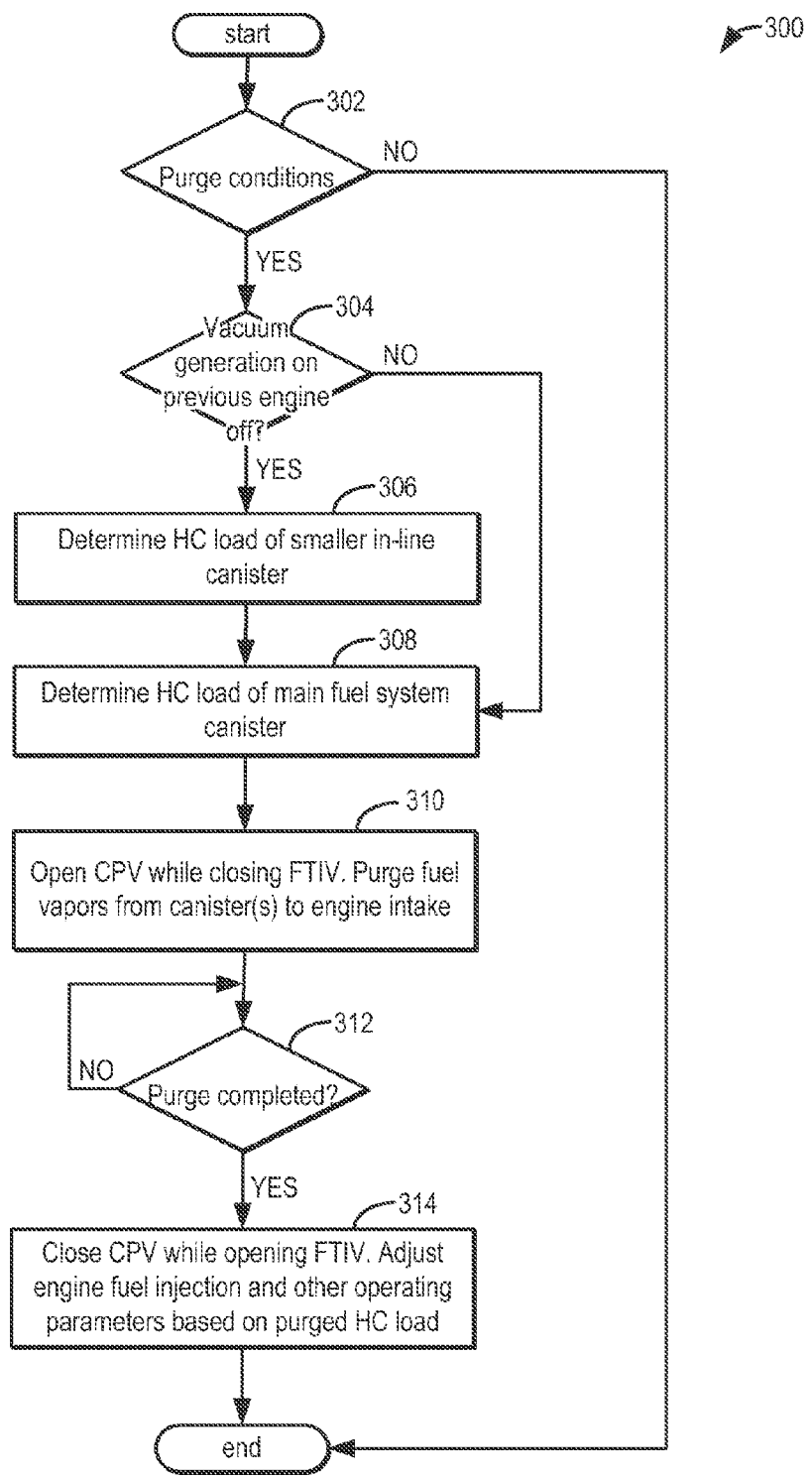
FIG. 3 shows a high level flow chart illustrating an example purging routine.

Now turning to FIG. 3, an example routine 300 is described for coordinating a purging of the first, larger (main) canister of the engine's fuel system with the purging of the second, smaller (auxiliary) canister of the engine's fuel system.

At 302, purge conditions may be confirmed, else the routine may end. Upon confirmation of purge conditions, at 304, the routine includes confirming whether a vacuum generation routine was performed on the immediately preceding engine-off condition. As such, if a vacuum generation routine (as discussed in FIG. 2) was previously performed, then the smaller canister of the fuel system (that is, canister 62 of FIG. 1) may have at least some fuel vapors stored therein. Accordingly, if a vacuum generation routine was previously performed, then at 306, the routine includes determining a hydrocarbon (HC) load of the second, smaller canister. At 308, a HC load of the first, larger canister of the fuel system may be determined. As such, if no vacuum generation routine was previously performed, then the routine may proceed directly to 308 to determine the HC load of the larger canister only.

At 310, the routine includes purging fuel vapors from each of the first canister and the second canister to the engine intake manifold. Herein, purging fuel vapors from each of the first and second canister includes closing the fuel tank isolation valve and opening the canister purge valve. For example, the canister purge valve may be opened to purge a first amount of fuel vapors from the first canister and a second amount of fuel vapors from the second canister. Canister purge data (e.g., canister purge rate, duration, purge valve duty cycle, etc.) may be based on engine operating conditions. These may include, for example, mass air flow (MAF), manifold air pressure (MAP), a desired air-to-fuel ratio, air-to-fuel ratio feedback from an oxygen sensor and/or hydrocarbon sensor coupled downstream of the canisters and/or to the engine intake manifold, etc. The canister purge data may also be based on a loading state of each of the first and second canisters (that is, amount/concentration of fuel vapors stored in the canister), as learned during respective canister loading operations immediately preceding the canister purging operations.

At 312, it may be determined if the purge operation has been completed. In one example, completion of purging may be based on the elapse of a purge duration, the purge duration calculated based on the purge rate and the purge load of each canister. Alternatively, it may be confirmed that the stored fuel vapor amount in at least the first, larger canister is below a threshold. As such, since the HC load of the first, larger canister is larger than the HC load of the second, smaller canister, a purge duration required to sufficiently purge the first canister will have also sufficiently purged the second canister. The stored amount of fuel vapors in each canister may be estimated based on the canister purge rate, a rate of air flow through the canister, and air-to-fuel ratio feedback from an oxygen sensor and/or hydrocarbon sensor downstream of the canister, feedback from a pressure sensor coupled to canisters, etc. Alternatively, the stored fuel vapor amount may be learned during a previous canister loading or purging operation and filtered down as a function of a canister purge duration, or purge volume. In one example, it may be confirmed that the canisters are empty.

At 314, upon completion of purging, the canister purge valve may be closed while the FTIV is opened to allow fuel tank vapors to be stored in the freshly purged larger canister. The routine further includes adjusting an engine fuel injection based on the amount of fuel vapors purged from the first and second canisters. In the example where the purge valve was opened to purge a first amount of fuel vapors from the first canister and a second amount of fuel vapors from the second canister, the controller may adjust the engine fuel injection based on the first and second amount of purged fuel vapors. Specifically, based on the canister purge data (e.g., the canister purge rates, the amount purged from each canister, etc.), a fuel injection to the engine cylinders may be adjusted to provide a desired air-to-fuel ratio. In one example, as the (first and second) amount of fuel vapors directed to the engine intake from the first and second canisters increases, an amount of fuel injected to the engine may be correspondingly decreased to maintain the desired air-to-fuel ratio (for example, at or around stoichiometry). In this way, by adjusting the fuel injection to the engine based on the amount of fuel vapors purged from the larger, main canister as well as the smaller in-line canister, air-to-fuel ratio deviations may be better compensated for.

In one example, during a first key-on condition, the controller may spin the engine fueled and store fuel tank vapors generated during engine operation in a first, larger canister of the engine's fuel system. During a second key-off condition, the controller may spin the engine unfueled and store fuel tank vapors in a second, smaller canister of the engine's fuel system, the smaller canister coupled to the intake manifold downstream of the fuel tank. The first key-on condition may precede (e.g., immediately precede) the second key-off condition. Additionally, during the first key-on condition, purging conditions may not be met and so no purging operation may occur. Thus, spinning the engine fueled during the first key-on condition may include spinning the engine with a purge valve coupled between the fuel tank and the intake manifold closed. In comparison, spinning the engine unfueled during the second key-off condition may include spinning the engine with the purge valve open.

For example, when the vehicle has been in a key-off soak for a threshold duration, the engine's control system may be re-enabled (or woken up) and a starter motor may be operated to spin the engine, unfueled, to generate intake vacuum, while absorbing any fuel vapors pulled from the fuel tank during the spinning in the smaller canister. To expedite vacuum generation, an air intake throttle may be moved away from its neutral (or partially open) position to, or towards, a fully closed position during the engine spinning. Then, when a threshold amount of intake vacuum has been generated, the air intake throttle may be returned to its original neutral (or partially open) position.

During a third, subsequent key-on condition following the second key-off condition, the controller may again spin the engine fueled and store fuel vapors drawn from the fuel tank during the engine spinning in the larger canister coupled to the intake manifold upstream of the fuel tank. The third key-on condition may be a key-on condition wherein purging conditions are met. Accordingly, the controller may open the purge valve to purge a first amount of fuel vapors from the first canister and a second amount of fuel vapors from the second canister to the engine intake manifold, and then adjust a fuel injection to the engine based on the first and second amount of purged fuel vapors. That is, the controller may adjust (e.g., decrease) an engine fuel injection by a larger amount (as compared to if only the first, larger canister were purged) to provide a desired air-to-fuel ratio.

In this way, an engine may be spun during static conditions by a starter motor, without injecting fuel to the engine cylinders, to generate sufficient vacuum for required evaporative leak diagnostics. At the same time, fuel tank vapors drawn from the spinning engine can be stored in an in-line auxiliary canister to reduce the amount of fuel vapors drawn into the engine intake manifold, thereby reducing air-to-fuel ratio deviations. By performing leak diagnostics during the static conditions, factors that adversely skew the results of the leak detection routine, such as vehicle noise factors, fuel sloshing, high ambient temperatures, fuel vaporizations, and vehicle dynamics, can be reduced. Calibration efforts can also be improved. By improving the signal to noise ratio of the leak detection routine, leak detection accuracy can be enhanced, allowing the same components to reliably detect smaller leaks and meet more stringent federal emissions regulations. By purging the fuel vapors stored in the smaller canister during the intake manifold generation, air-to-fuel ratio deviations during subsequent engine operation may be reduced. Also, by disabling the vacuum generation under specified engine-off conditions, the vehicle operator may not be alarmed by a sudden engine idling noise.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle engine, comprising:
during a first key-on condition, spinning the engine fueled and storing fuel tank vapors in a first, larger canister; and
during a second key-off condition, spinning the engine unfueled and storing fuel tank vapors in a second, smaller canister.

2. The method of claim 1, wherein spinning the engine unfueled includes spinning the engine with starter motor assistance until a threshold intake vacuum is reached, and then disabling the starter motor.

3. The method of claim 2, further comprising, during the second key-off condition, after the threshold intake vacuum is reached, applying the vacuum to a vehicle fuel system to detect a leak in the fuel system.

4. The method of claim 1, wherein the second key-off condition includes each of: the engine being in a key-off condition for a threshold duration, the vehicle being stationary, a fuel tank refueling not taking place, an ambient temperature being lower than a threshold, a vehicle operator not being in the vehicle, a battery state of charge being higher than a threshold, and a hydrocarbon load of the second canister being lower than a threshold.

5. The method of claim 1, wherein spinning the engine unfueled includes disabling spark and holding an intake air throttle shut to spin the engine without injecting fuel.

6. The method of claim 1, wherein an intake manifold of the engine is coupled to the fuel tank, and wherein the first larger canister is coupled to the intake manifold upstream of the fuel tank and the second smaller canister is coupled to the intake manifold downstream of the fuel tank.

7. The method of claim 6, wherein the first key-on condition precedes the second key-off condition, and wherein the first key-on condition includes purging conditions not being met.

8. The method of claim 7, wherein the engine includes a purge valve coupled between the fuel tank and the intake manifold, downstream of the second canister, and wherein spinning the engine fueled during the first key-on condition includes spinning the engine with the purge valve closed while spinning the engine unfueled during the second key-off condition includes spinning the engine with the purge valve open.

9. The method of claim 8, during a third key-on condition following the second key-off condition, wherein purging conditions are met, opening the purge valve to purge a first amount of fuel vapors from the first canister and a second amount of fuel vapors from the second canister to the engine intake manifold, and adjusting a fuel injection to the engine based on the first and second amount of purged fuel vapors.

10. A method for a vehicle engine, comprising:
during a key-off condition,
operating a starter motor to spin the engine unfueled; and
storing fuel vapors drawn from a fuel tank during the spinning in a first canister coupled between the fuel tank and an engine intake manifold.

11. The method of claim 10, wherein spinning the engine unfueled includes spinning the engine with no air or fuel injection until a threshold intake vacuum is reached.

12. The method of claim 11, further comprising, after the threshold intake vacuum is reached, disabling the starter motor and applying the intake vacuum to the fuel tank to detect a leak in a fuel system of the vehicle.

13. The method of claim 12, further comprising, during a subsequent key-on condition, spinning the engine fueled and storing fuel vapors drawn from the fuel tank during the engine spinning in a second canister coupled to the intake manifold upstream of the first canister and upstream of the fuel tank, wherein the first canister is smaller than the second canister.

14. The method of claim 13, further comprising, during an engine purging condition, purging fuel vapors from each of the first canister and the second canister to the engine intake manifold, and adjusting a fuel injection based on the amount of fuel vapors purged from each canister.

15. The method of claim 10, wherein the key-off condition includes the engine being in key-off for a threshold duration, no fuel tank refueling being requested, the vehicle being stationary, an ambient temperature being lower than a threshold, a vehicle operator not being in the vehicle, a battery state of charge being higher than a threshold, and a hydrocarbon load of the first canister being lower than a threshold.

16. A vehicle system, comprising:
an engine including an intake manifold;
a battery-operated starter motor coupled to the engine;
a fuel tank;
a first, larger canister coupled to the intake manifold upstream of the fuel tank;
a second, smaller canister coupled to the intake manifold downstream of the fuel tank; and
a control system with computer readable instructions for,
during a key-off condition,
spinning the engine with starter motor assistance with no air or fuel injected into the engine; and
storing fuel vapors drawn from the fuel tank during the spinning in the second canister.

17. The system of claim 16, wherein spinning the engine with no air or fuel injected includes closing an intake throttle and disabling engine spark while spinning the engine until a threshold intake vacuum is reached, and wherein the control system includes further instructions for,
after reaching the threshold intake vacuum, disabling the starter motor and applying the vacuum to the fuel tank to identify a leak.

18. The system of claim 17, wherein the control system includes further instructions for disabling the starter motor and stopping vacuum generation during the spinning in response to one or more of an ambient temperature being higher than a threshold, a fuel tank refuel request being received, a vehicle operator sitting in the vehicle, a vehicle operator opening a door, hood, window, or trunk of the vehicle, and a hydrocarbon load of the second canister being higher than a threshold.

19. The system of claim 18, wherein the control system includes further instructions for, during a subsequent key-on condition,
    spinning the engine with air and fuel injected into the engine and storing fuel vapors drawn from the fuel tank during the spinning in the first canister.

20. The system of claim 19, wherein the control system includes further instructions for, during a purging condition,
    purging a first amount of fuel vapors from the first canister;
    purging a second amount of fuel vapors from the second canister; and
    adjusting an engine fuel injection based on the first and second amount of purged fuel vapors.

\* \* \* \* \*